US011047529B2

(12) United States Patent
Kuczek et al.

(10) Patent No.: US 11,047,529 B2
(45) Date of Patent: Jun. 29, 2021

(54) COMPOSITE PRESSURE VESSEL ASSEMBLY WITH AN INTEGRATED NOZZLE ASSEMBLY

(71) Applicant: UTRC-IBD, East Hartford, CT (US)

(72) Inventors: Andrzej Ernest Kuczek, Bristol, CT (US); Ellen Y. Sun, South Windsor, CT (US); Justin R. Hawkes, Marlborough, CT (US); Paul F Croteau, Columbia, CT (US); Wenping Zhao, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 128 days.

(21) Appl. No.: 16/095,584

(22) PCT Filed: Apr. 22, 2016

(86) PCT No.: PCT/US2016/028934
§ 371 (c)(1),
(2) Date: Oct. 22, 2018

(87) PCT Pub. No.: WO2017/184170
PCT Pub. Date: Oct. 26, 2017

(65) Prior Publication Data
US 2019/0128476 A1    May 2, 2019

(51) Int. Cl.
*F17C 1/16* (2006.01)
*F17C 1/00* (2006.01)
(52) U.S. Cl.
CPC .................. *F17C 1/16* (2013.01); *F17C 1/00* (2013.01); *F17C 2201/0152* (2013.01);
(Continued)

(58) Field of Classification Search
CPC ...... F17C 1/00; F17C 1/02; F17C 1/14; F17C 1/16
See application file for complete search history.

(56) References Cited

U.S. PATENT DOCUMENTS 2,672,254 A * 3/1954 Boardman ............. B65D 88/02
220/565
2,920,784 A * 1/1960 Boardman ................ F17C 1/08
220/565

(Continued)

FOREIGN PATENT DOCUMENTS

| DE | 102008064364 A1 | 7/2010 | |
| WO | 2016057023 A1 | 4/2016 | |
| WO | WO-2016057023 A1 * | 4/2016 | ............ F17C 13/002 |

OTHER PUBLICATIONS

ISR/WO, Issued Jan. 3, 2017 for related International Application No. PCT/US2016/028934; 12 pages.

*Primary Examiner* — Steven A. Reynolds
*Assistant Examiner* — Javier A Pagan
(74) *Attorney, Agent, or Firm* — Cantor Colburn LLP

(57) ABSTRACT

A pressure vessel assembly includes a vessel having a wall defining a chamber and a circumferentially continuous lip projecting into the chamber from the wall. The lip defines a through-bore that is in fluid communication with the chamber. A nozzle assembly of the pressure vessel assembly includes a tube projecting at least in-part into the through-bore, and an o-ring disposed between, and in sealing contact with, the tube and the lip.

13 Claims, 7 Drawing Sheets

(52) U.S. Cl.
CPC ............. *F17C 2201/0166* (2013.01); *F17C 2201/0171* (2013.01); *F17C 2203/0604* (2013.01); *F17C 2203/0663* (2013.01); *F17C 2205/0305* (2013.01); *F17C 2209/2127* (2013.01)

(56) References Cited

U.S. PATENT DOCUMENTS

| | | | | |
|---|---|---|---|---|
| 3,414,153 A * | 12/1968 | Leroux | ............ | B65D 88/02 220/565 |
| 3,528,582 A * | 9/1970 | Rigollot | ............ | F17C 1/08 220/581 |
| 4,062,356 A * | 12/1977 | Merrifield | ............ | A62B 7/04 128/205.22 |
| 4,282,823 A * | 8/1981 | Santi | ............ | B65D 88/78 114/341 |
| 4,343,409 A * | 8/1982 | Silver | ............ | B65D 88/04 220/565 |
| 4,374,478 A * | 2/1983 | Secord | ............ | F17C 3/022 73/863.31 |
| 4,932,546 A * | 6/1990 | Stannard | ............ | B65D 25/04 220/501 |
| 5,284,267 A * | 2/1994 | Polletta | ............ | F17C 7/00 220/4.14 |
| 5,564,272 A * | 10/1996 | Warner | ............ | F02K 9/34 220/89.2 |
| 5,577,630 A * | 11/1996 | Blair | ............ | B60K 15/03006 220/581 |
| 5,613,490 A * | 3/1997 | Mayes | ............ | A62B 7/02 128/201.27 |
| 5,651,474 A * | 7/1997 | Callaghan | ............ | B29C 70/088 220/565 |
| 5,787,920 A * | 8/1998 | Krasnov | ............ | B60K 15/03006 137/255 |
| 5,865,923 A * | 2/1999 | Johnson | ............ | B29C 53/824 156/172 |
| 5,944,215 A * | 8/1999 | Orlowski | ............ | F16J 12/00 220/501 |
| 6,095,367 A * | 8/2000 | Blair | ............ | B60K 15/03006 220/581 |
| 6,190,441 B1 * | 2/2001 | Czabala | ............ | B01D 53/0446 96/130 |
| 6,220,779 B1 * | 4/2001 | Warner | ............ | B29C 65/58 403/381 |
| 6,412,650 B1 * | 7/2002 | Warner | ............ | F17C 1/08 220/4.12 |
| D483,859 S * | 12/2003 | Omholt | ............ | D24/110 |
| 6,676,163 B2 * | 1/2004 | Joitescu | ............ | B60K 15/07 280/834 |
| 6,708,719 B2 * | 3/2004 | Idoguchi | ............ | F17C 1/00 137/266 |
| 6,883,536 B2 * | 4/2005 | Hervio | ............ | F17C 1/02 137/259 |
| 8,608,202 B2 * | 12/2013 | Dossow | ............ | B60K 15/07 280/834 |
| 9,175,806 B2 * | 11/2015 | Ramoo | ............ | B63B 25/14 |
| 9,321,588 B2 * | 4/2016 | Ramoo | ............ | B65D 90/02 |
| 9,664,338 B2 * | 5/2017 | Hata | ............ | F17C 3/025 |
| 9,708,120 B2 * | 7/2017 | Ramoo | ............ | B65D 90/08 |
| D813,978 S * | 3/2018 | Kennard | ............ | D23/202 |
| 10,352,500 B2 * | 7/2019 | Ramoo | ............ | B65D 90/02 |
| 10,465,848 B1 * | 11/2019 | Newhouse | ............ | F17C 1/08 |
| 2009/0050635 A1 * | 2/2009 | Richards | ............ | F17C 1/14 220/584 |
| 2011/0031257 A1 * | 2/2011 | Metz | ............ | F17C 1/08 220/624 |

* cited by examiner

COMPOSITE PRESSURE VESSEL ASSEMBLY WITH AN INTEGRATED NOZZLE ASSEMBLY

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

CROSS-REFERENCE TO RELATED APPLICATIONS

This application claims the benefit of PCT/US2016/028934 filed Apr. 22, 2016, which is incorporated herein by reference in its entirety.

BACKGROUND

The present disclosure relates to a pressure vessel assembly and more particularly to a pressure vessel assembly with an integrated nozzle assembly.

Pressure vessels may serve as storage media (e.g., gas) for a wide variety of consumer, commercial, and industrial processes. In order to store sufficient gas for any operation within a given volume, the gas is stored at high pressure. Traditionally, pressure vessels have a typical spherical or cylindrical design that evenly distributes stress in the containment perimeter. Unfortunately, such tanks do not use allocated space efficiently. For example, a spherical vessel fills a cubic space with about fifty-two percent efficiency, and a cylindrical vessel fills a rectangular volume with approximately seventy-eight percent efficiency. More recent improvements in pressure vessels that generally conform to a rectangular volume may fill the space with about ninety percent efficiency relative to a true rectangular volume.

The designs of non-spherical/cylindrical pressure vessels to support high internal pressure are complex, including variable-curvature external surfaces and internal structure to transfer mechanical loads. The large size of a high conformable vessels and the complicated shapes makes manufacturing challenging. The transfer or distribution of stress and related reliability of the pressure vessel itself is further challenged with the integration of various nozzles and ports in the pressure vessels. In addition, manufacturing needs to consistently provide reliable, high-volume, lightweight and low-cost constructions.

SUMMARY

A pressure vessel assembly according to one, non-limiting, embodiment of the present disclosure includes a vessel including a wall defining a chamber and a circumferentially continuous lip projecting into the chamber from the wall, the lip defining a through-bore in fluid communication with the chamber; and a nozzle assembly including a tube projecting at least in-part into the through-bore, and an o-ring disposed between and in sealing contact with the tube and the lip.

Additionally to the foregoing embodiment, the nozzle assembly includes a flange projecting radially outward from the tube and in contact with the wall.

In the alternative or additionally thereto, in the foregoing embodiment, the tube includes a first portion projecting axially inward from the flange and into the through-bore and an opposite second portion projecting axially outward from the flange.

In the alternative or additionally thereto, in the foregoing embodiment, the first portion includes an outer surface having a contour constructed and arranged to engage the lip.

In the alternative or additionally thereto, in the foregoing embodiment, the contour is circumferentially continuous.

In the alternative or additionally thereto, in the foregoing embodiment, the contour is a barb constructed and arranged to produce a sealing friction between the lip and the outer surface when the pressure vessel assembly is under a positive pressure.

In the alternative or additionally thereto, in the foregoing embodiment, an internal pressure in the chamber biases the lip radially inward against the barb, and wherein the o-ring is resiliently compressed between the outer surface and the lip.

In the alternative or additionally thereto, in the foregoing embodiment, the o-ring and the contour are proximate to a distal end segment of the first portion.

In the alternative or additionally thereto, in the foregoing embodiment, the o-ring is located axially outward from the contour.

In the alternative or additionally thereto, in the foregoing embodiment, the tube is made of a material that is harder than a material of the lip.

In the alternative or additionally thereto, in the foregoing embodiment, the wall and the lip are part of a liner.

In the alternative or additionally thereto, in the foregoing embodiment, the vessel includes a layer enveloping the wall with the flange disposed between the wall and the layer and the first portion projects through the layer.

In the alternative or additionally thereto, in the foregoing embodiment, the layer is made of a composite and the liner is blow molded plastic.

In the alternative or additionally thereto, in the foregoing embodiment, the composite is a resin impregnated fiber.

A pressure vessel assembly according to another, non-limiting, embodiment includes a first vessel including a first wall defining a first chamber and a circumferentially continuous first lip projecting into the first chamber from the first wall, the first lip defining a first through-bore in fluid communication with the first chamber; a second vessel including a second wall defining a second chamber and a circumferentially continuous second lip projecting into the second chamber from the second wall, the second lip defining a second through-bore in fluid communication with the second chamber; and a nozzle assembly including a tube projecting at least in-part into the first and second through-bores, a first o-ring disposed between and in sealing contact with the tube and the first lip, and a second o-ring disposed between and in sealing contact with the tube and the second lip.

Additionally to the foregoing embodiment, the nozzle assembly includes a flange projecting radially outward from the tube and disposed between the first and second walls.

In the alternative or additionally thereto, in the foregoing embodiment, the nozzle assembly includes a first contour projecting radially outward from the tube and in contact with the first lip, and a second contour projecting radially outward from the tube and in contact with the second lip.

In the alternative or additionally thereto, in the foregoing embodiment, the first and second contours and the first and second o-rings are proximate to distal end segments of the respective first and second lips.

In the alternative or additionally thereto, in the foregoing embodiment, the first vessel includes a first layer enveloping the first wall, the second vessel includes a second layer enveloping the second wall and in-part in contact with the first layer, and wherein the tube projects through the first and second layers.

In the alternative or additionally thereto, in the foregoing embodiment, the first and second contours are circumferentially continuous barbs.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION OF THE INVENTION

Figure 1:
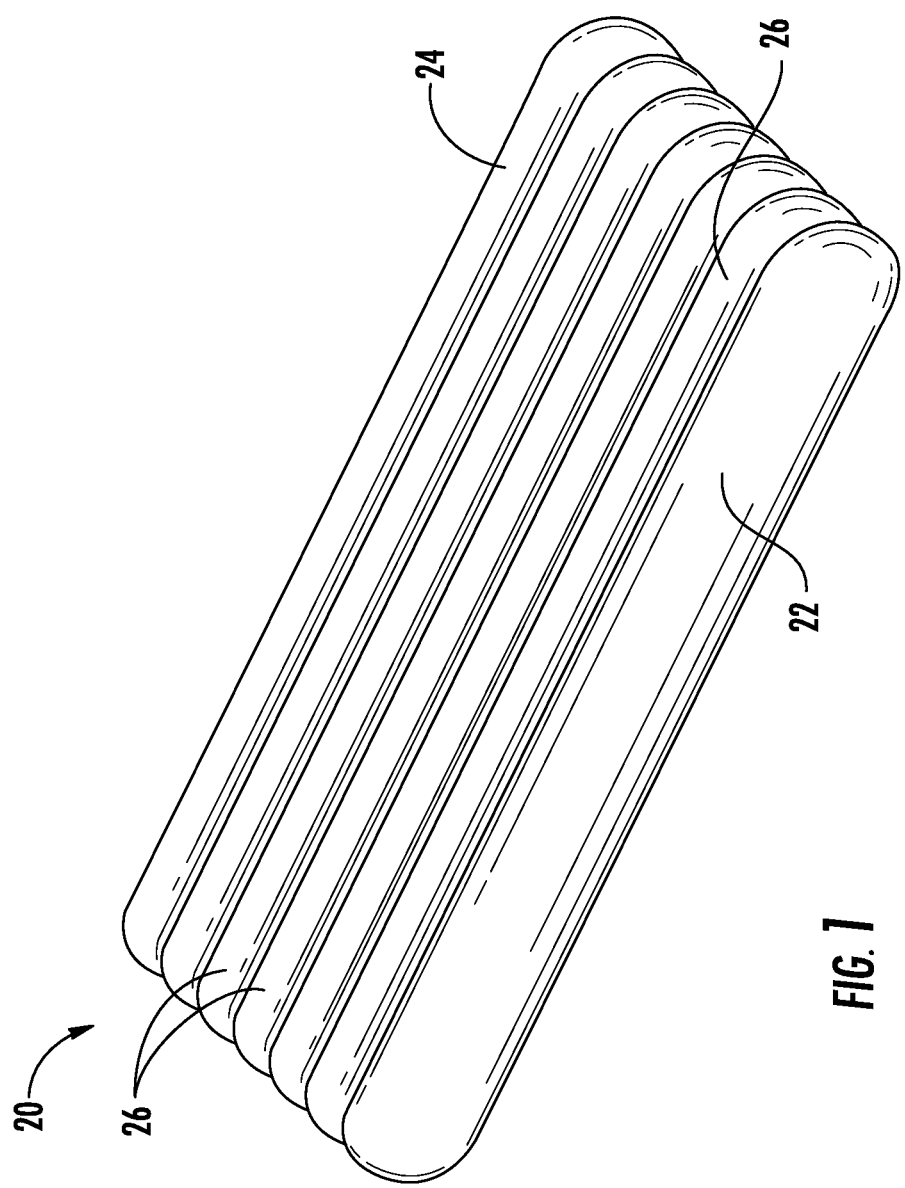
FIG. 1 is a perspective view of a pressure vessel assembly configured to store a pressurized fluid according to an exemplary embodiment of the invention.

Referring now to FIG. 1, an example of a pressure vessel or tank assembly 20 configured to store a high pressure fluid is illustrated. Exemplary fluids that may be stored within the pressure vessel 20 include, but are not limited to, compressed natural gas (CNG), hydrogen, propane, methane, air, and hydraulic fluid, for example. The pressure vessel assembly 20 may generally include two flanking vessels 22, 24 and at least one interior vessel 26 (e.g., five identical interior vessels illustrated) joined to and disposed between the flanking vessels 22, 24. Each vessel 22, 24, 26 may generally be elongated with the overall configuration of the pressure vessel assembly 20 generally being a rectangular shape, but as will be appreciated from the description, herein, other shapes are contemplated.

Figure 2:
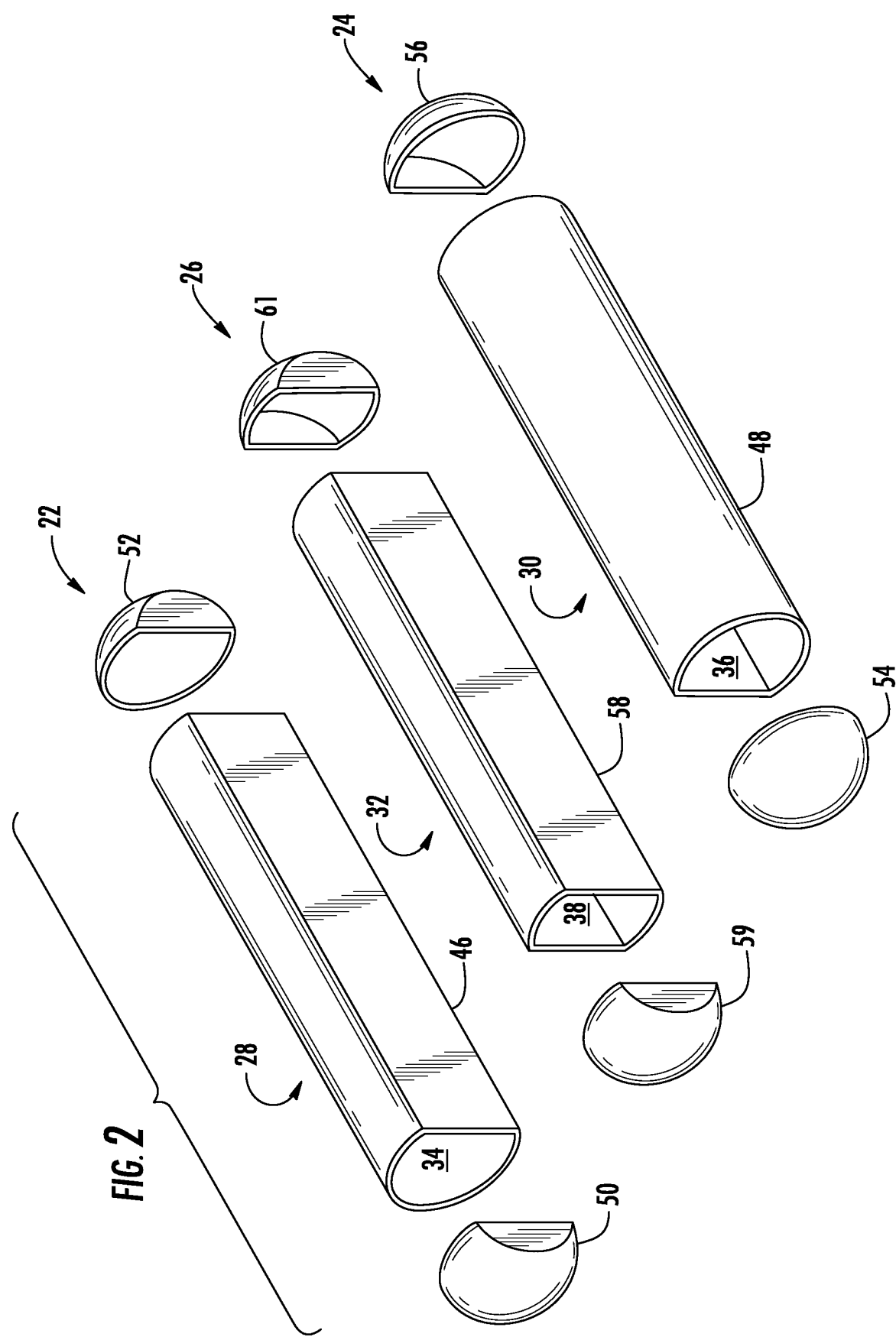
FIG. 2 is an exploded perspective view of liners of the pressure vessel assembly.

Referring to FIG. 2, each vessel 22, 24, 26 may include respective liners 28, 30, 32. Each liner 28, 30, 32 may define the boundaries of respective chambers 34, 36, 38 for the fluid storage. The flanking end liners 28, 30 may include respective lobes 46, 48 with lobe 46 closed-off by opposite end caps 50, 52 and lobe 46 closed-off by opposite end caps 54, 56. Each lobe 46, 48 may be circumferentially continuous and substantially cylindrical. The interior liner 32 may include a lobe 58 with the lobe 58 closed-off by opposite end caps 59, 61. Lobe 58 may be circumferentially continuous. The liners 28, 30, 32 may be made of any material and thicknesses capable of providing the necessary structural support, weight, operating characteristics, cost limitations and other parameters necessary for a particular application. Examples of liner material may include steel or other metallic compositions and plastic. The liners 28, 30, 32 may further be blow molded plastic, or injection molded plastic with the end caps being an integral and unitary part of the lobes.

Figure 3:
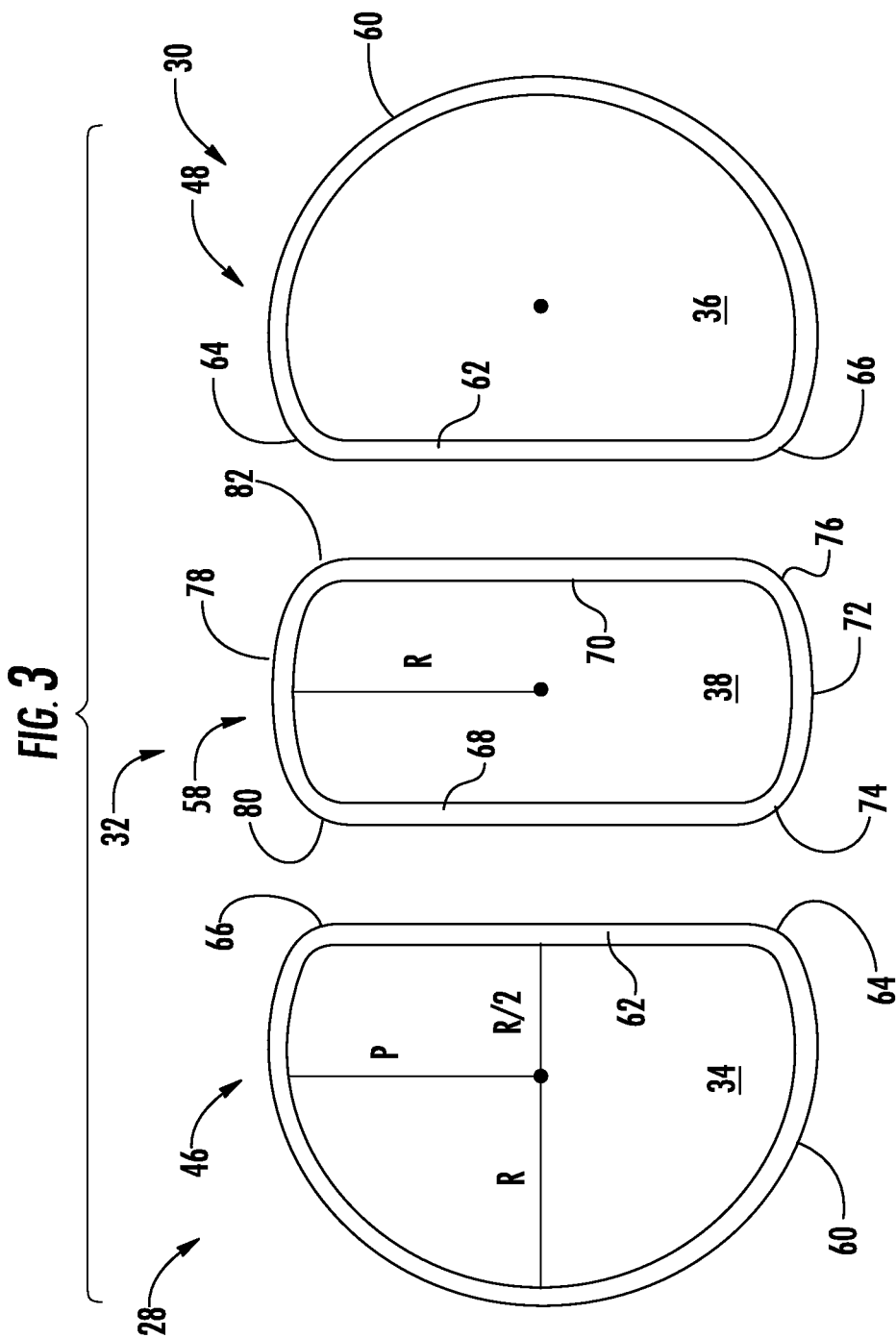
FIG. 3 is a cross section of the liners.

Referring to FIG. 3, the lobes 46, 48 of the respective flanking liners 28, 30 may be substantially identical and are arranged such that the lobe 46 of the first flanking liner 28 is rotated about one-hundred and eighty (180) degrees relative to the lobe 48 of the opposite flanking liner 30 (i.e., are arranged as a mirror image of one-another). Each flanking lobe 46, 48 may include a generally cylindrical outer portion or wall 60 and an interior portion or wall 62. The interior wall 62 may be substantially planar and may laterally span between a first end 64 and a second end 66 of the cylindrical outer wall 60. In one embodiment, the interior wall 62 is integrally formed with the ends 64, 66 of the cylindrical outer wall 60. At least a portion of the curvature of the cylindrical outer wall 60 is defined by a radius R. In one embodiment, the portion of the outer wall 60, opposite the interior wall 62, includes a circular shape or curve generally of a two-hundred and forty (240) degree angle as defined by the radius R. Consequently, the overall height of the flanking lobes 46, 48 is equal to double the length of the radius R of the cylindrical outer wall 60. The interior wall 62 (i.e., disposed vertically per the landscape illustrative perspective of FIG. 3) is generally parallel to and spaced apart from a vertical plane P that includes the origin of the radius R that defines the curvature of the outer wall 60. In one embodiment, the distance between the interior wall 62 and the parallel vertical plane P is about half the length of the radius R. As a result, the flanking lobes 46, 48 generally have a width equal to about one and a half the length of the radius of curvature R of the outer wall 60.

The illustrated interior lobe 58 includes first and second interior sidewalls 68, 70 that may be diametrically opposite one another, substantially vertically arranged, and separated from one another by a distance. In one embodiment, the width of the interior lobe 58 is generally equal to the radius of curvature R of the end lobes 46, 48. The thicknesses of the first interior sidewall 68 and the second interior sidewall 70 may be identical and may be equal to the thickness of the interior wall 62 of the flanking lobes 46, 48. A first outside wall 72 extends between a first end 74 of the first interior sidewall 68 and a first end 76 of the second interior sidewall 70. Similarly, a second outside wall 78 extends between a second end 80 of the first interior sidewall 68 and a second end 82 of the second interior sidewall 70.

The curvature of the first outside wall 72 and the second outside wall 78 may be defined by a circular shape or curve generally of a sixty (60) degree angle by a radius R. In one embodiment, the radius of curvature R of the interior lobe 58 is substantially identical to the radius of curvature R of the flanking lobes 46, 48. Consequently, the distance between the first curved wall 72 and the second curved wall 78 is double the length of the radius of curvature R, and is therefore, substantially equal to the height of the flanking lobes 46, 48.

Figure 4:
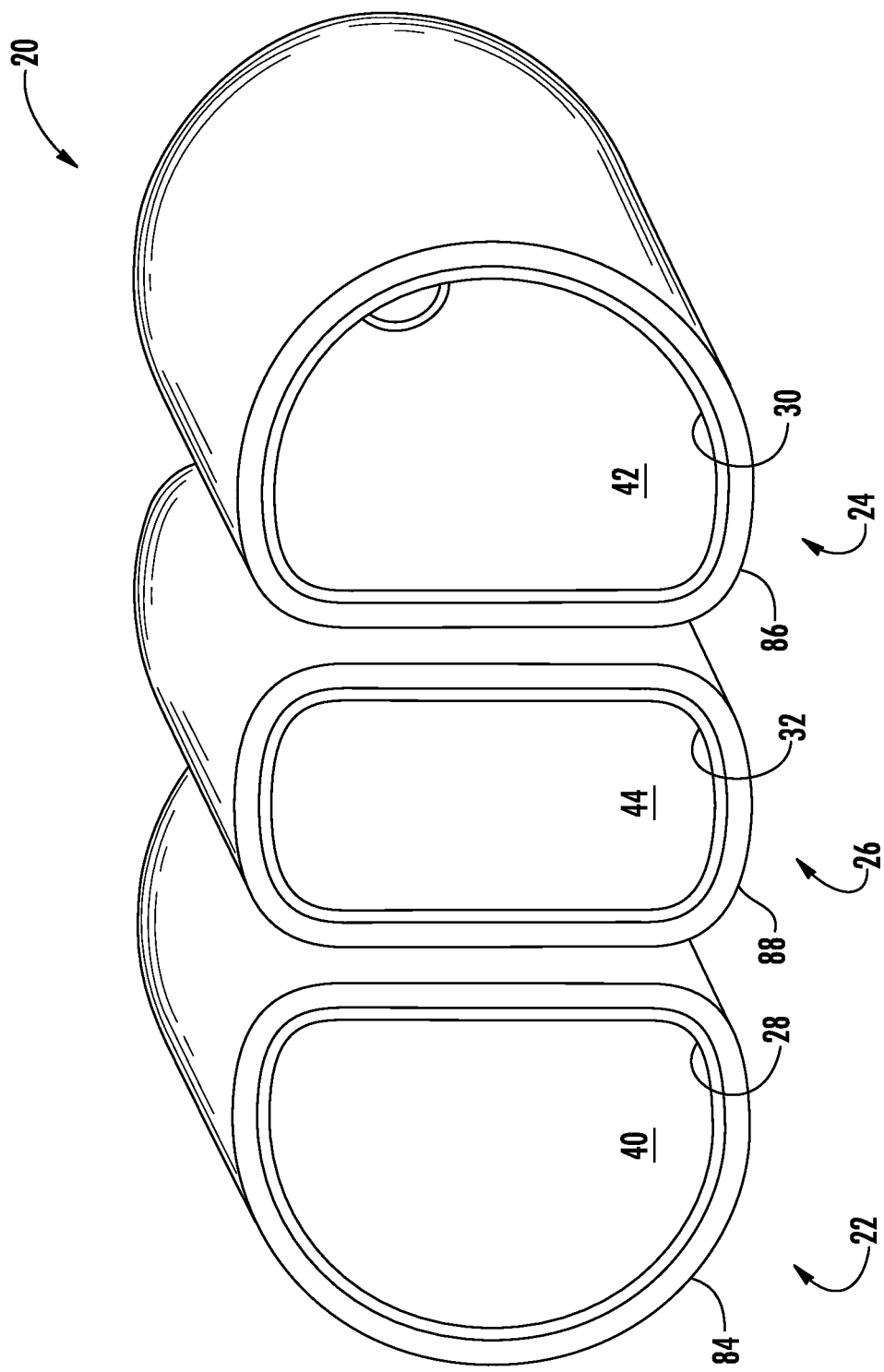
FIG. 4 is a perspective cross section of the liners with a mid-layer applied.

Referring to FIG. 4, the vessels 22, 24, 26 each include a mid-layer 84, 86, 88 that substantially covers the respective liners 28, 30, 32. The mid-layer 84 may be a continuous fiber wrapping or prepregs (i.e., fiber with resin) wrapped about the lobes and end caps of the liners for structural strength and for distributing internal stress. Alternatively, the mid-layers 84, 86, 88 may include a braiding that wraps about the respective liners 28, 30, 32. The primary reinforcement (i.e., the fibers or braiding), may be made of a carbon fiber, a glass fiber or an aramid fiber. A matrix material or resin for binding the continuous fibers may include epoxy, vinyl ester and other resin systems that may be nano-enhanced. It is further contemplated and understood that the mid-layers 84, 86, 88 may be made of resin impregnated fibers that may be chopped. As one example, the chopped fibers may be about one (1) inch (2.54 cm) in length.

When the pressure vessel assembly 20 is at least partially assembled, the interior wall 62 of the flanking lobe 46 is opposed and in proximity to the interior sidewall 68 of the interior lobe 58. The portion of the mid-layer 84 covering the interior wall 62 may be directly adjacent and adhered to the portion of the mid-layer 88 that covers the sidewall 68. Adherence may be achieved when the vessel assembly 20 is cured. Similarly, the interior wall 62 of the flanking lobe 48 is opposed and in proximity to the interior sidewall 70 of the interior lobe 58. The portion of the mid-layer 86 covering the interior wall 62 may be directly adjacent and adhered to the portion of the mid-layer 88 that covers the sidewall 70.

Figure 5:
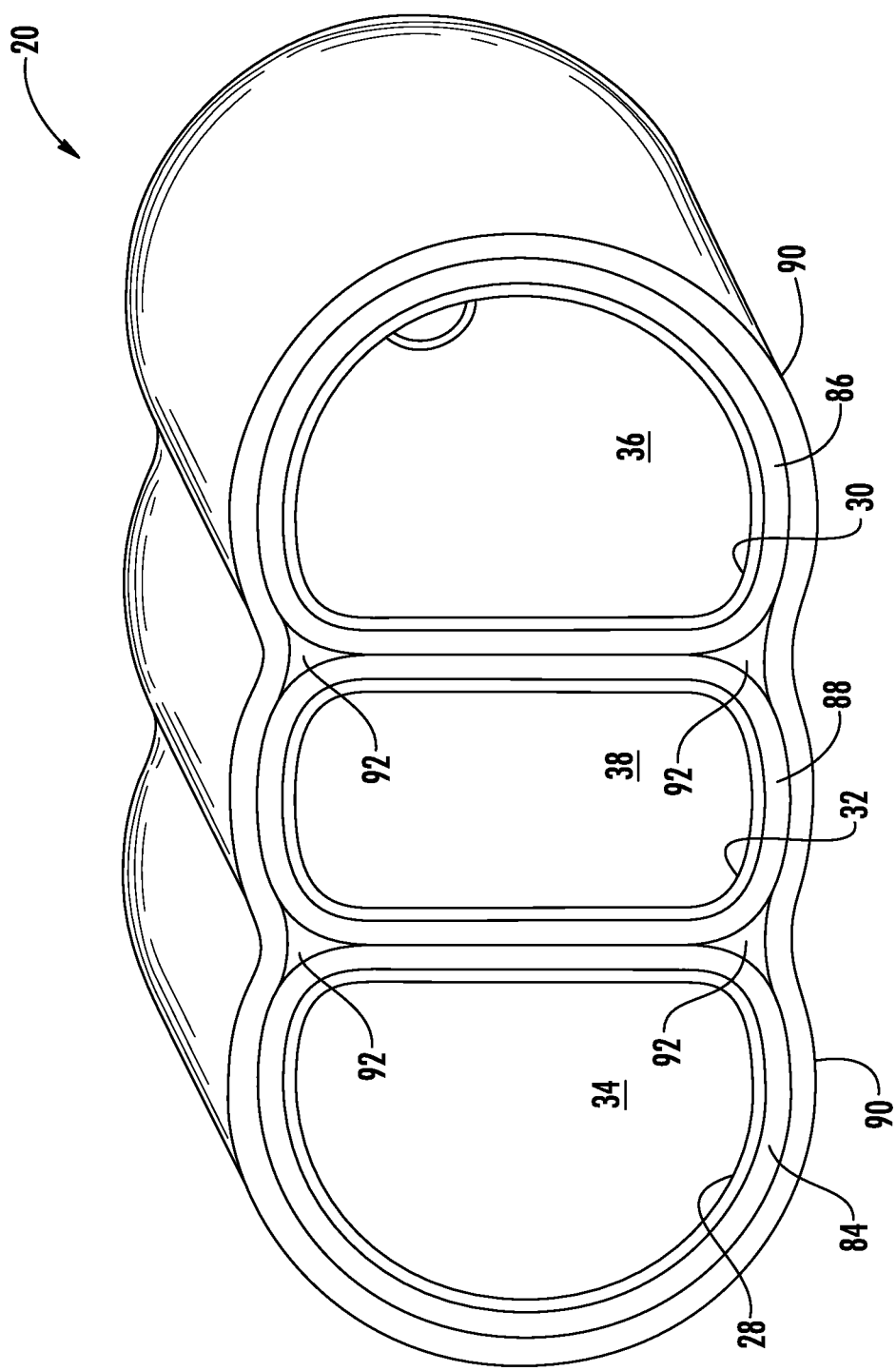
FIG. 5 is a perspective cross section of the pressure vessel assembly.

Referring to FIG. 5, the composite vessel assembly 20 may include an outer layer 90 that generally covers and envelops the inner-layers 84, 86, 88. The outer layer 90 may be applied after the inner-layers 84, 86, 88 are joined. The outer layer 90 may be a composite, and may be a mixture of a non-continuous (e.g., chopped) fiber and resin that may be spray applied (i.e., spray chop fiber/resin) or may be a sheet molding compound (SMC). The primary reinforcement (i.e., the chopped fibers), may be made of a carbon fiber, a glass fiber or an aramid fiber of about one (1) inch in length (2.5 cm). The resin for binding the chopped fibers may include epoxy, vinyl ester and other resin systems that may be nano-enhanced. It is contemplated and understood that the inner-layers 84, 86, 88 may also be similar in composition and application process as the outer layer 90.

The pressure vessel assembly 20 may further include a plurality of junctions 92 with each junction located where respective ends of the outer walls 60, 72, 78, ends of the sidewalls 68, 70, and ends of interior walls 62 generally meet. Each junction 92 may generally be Y-shaped (i.e., a three pointed star) and may be made of the same material as the outer layer 90.

In one embodiment where continuous fiber is utilized for the inner-layers 84, 86, 88 and the chopped fiber is used for the outer layer 90, the vessel assembly 20 may be much lighter in weight than if the entire assembly were made with a chopped fiber. However, the internal structural sidewalls 68, 70 and internal walls 62 may have different thicknesses (e.g., about half as thick) than the outer walls 60, 72, 78 with the hybrid of continuous fiber and chopped fiber. For this embodiment of hybrid composite wall construction, the internal structural sidewalls 68, 70 and internal walls 62 may have a higher or lower effective stiffness than the hybrid outer walls 60, 72, 78, and therefore the junctions 92 will require an optimized angle that is different from about one-hundred and twenty (120) degrees that would typically be derived from homogeneous materials. The junction 92 angle and the internal wall thickness can be optimized based on specific material properties and hybrid wall construction.

Figure 6:
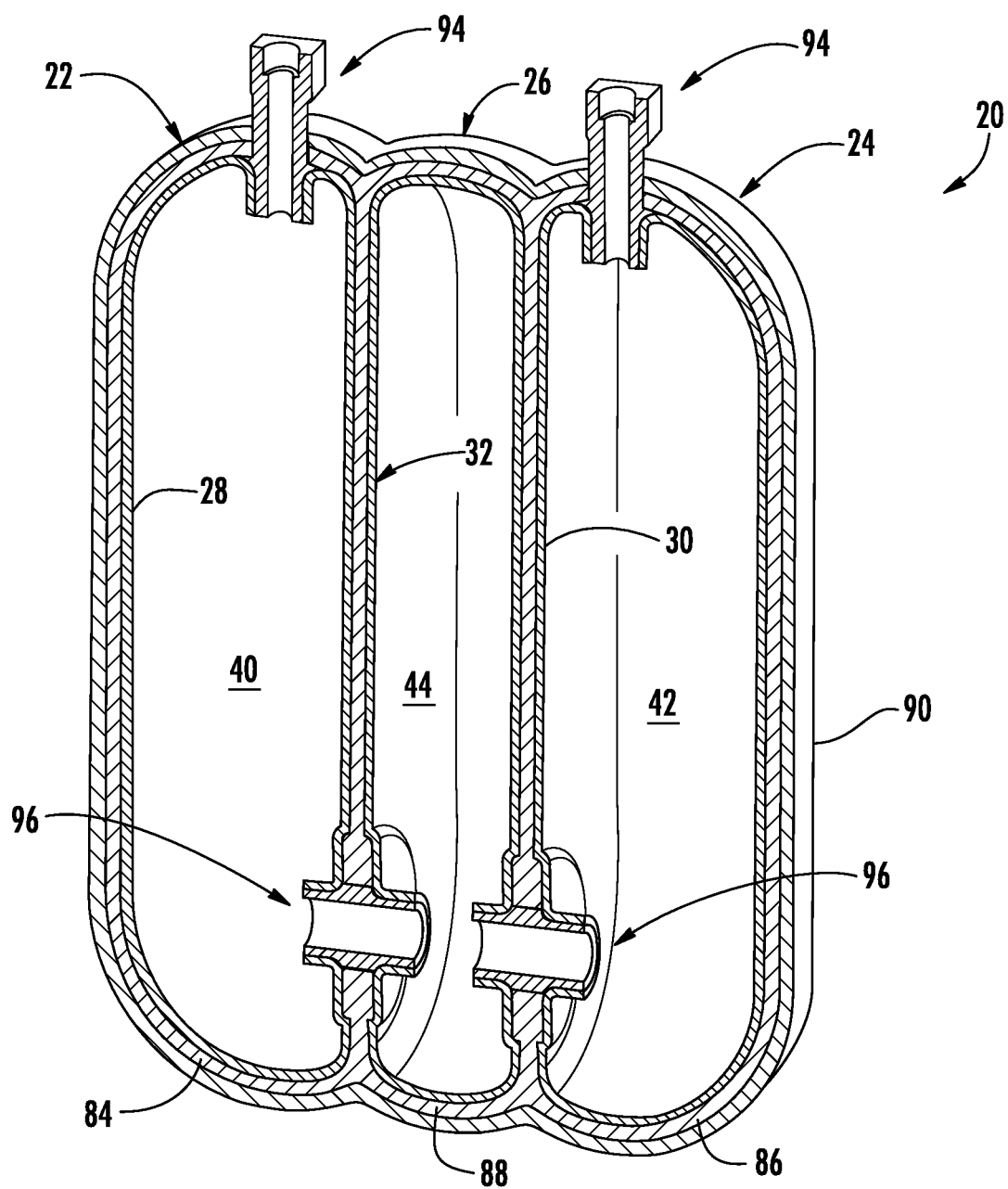
FIG. 6 is a perspective cross section of the pressure vessel assembly with integrated nozzle assemblies.
Figure 7:
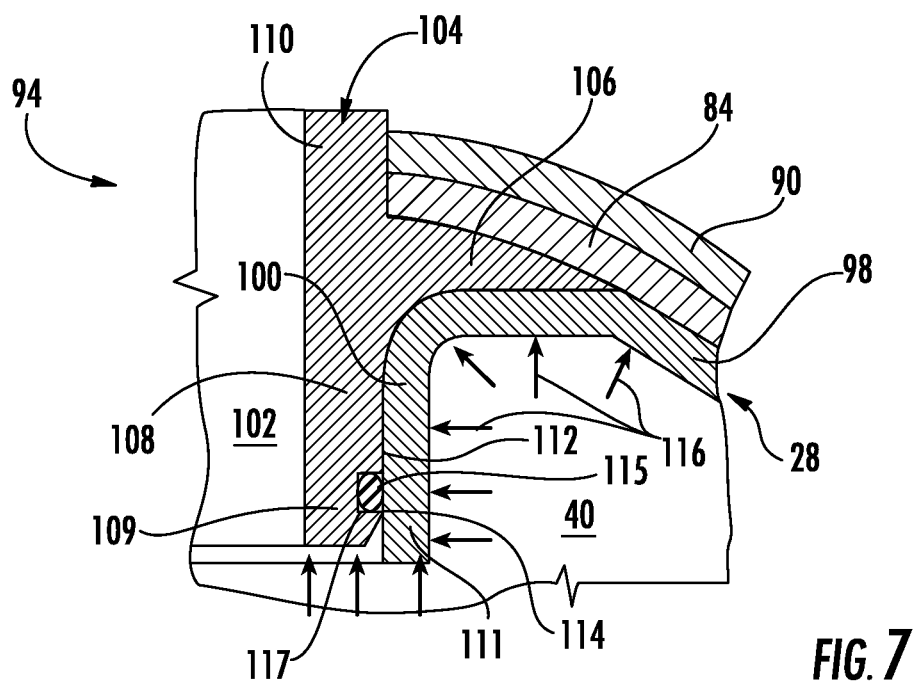
FIG. 7 is an enlarged cross section of a supply nozzle assembly of the pressure vessel assembly.

Referring to FIGS. 6 and 7, the pressure vessel assembly 20 may include at least one supply nozzle assembly 94 (i.e., two illustrated) and at least one transfer nozzle assembly 96 (i.e., two illustrated). The supply nozzle assembly 94 is configured to flow the pressurized fluid into or out of any one or more of the chambers 40, 42, 44. The transfer nozzle assembly 96 is configured to flow the pressurized fluid between chambers 40, 42, 44. As applied herein, the term "supply" refers to the flow of a fluid (i.e. liquid or gas) into and/or out of the pressure vessel assembly 20. For ease of explanation, the nozzle assemblies 94, 96 will be described with reference to the first and mid vessels 22, 26; however, it is understood that the nozzle assemblies may be mounted to any one of a number of vessels and in any variety of configurations. It is further understood and contemplated that many novel attributes between the nozzle assemblies 94, 96 of the present disclosure may be the similar although the applications between the nozzle assemblies may be different.

The liner 28 of the first vessel 22 may include a wall 98 that generally defines the boundaries of the chamber 40, and a lip 100 that projects into the chamber 40 from the wall 98. The lip 100 may be circumferentially continuous and defines a through-bore 102 in fluid communication with the chamber 40. In one embodiment, the liner 28 may be one unitary piece and made of a blow molded plastic.

The supply nozzle assembly 94 may include a tube 104 and a flange 106 that projects radially outward from the tube 104 and may be circumferentially continuous (i.e. annular). The flange 106 is generally disposed and in contact between the wall 98 of the liner 28 and the mid-layer 84. The tube 104 may provide direct fluid communication between the chamber 40 and the environment outside of the pressure vessel assembly 20. The tube 104 may include a first portion 108 that projects inward from the flange 106, and substantially into the through-bore 102. When the first portion 108 is fully inserted into the through-bore 102, a distal end segment or rim 109 may be substantially axially aligned with a distal end segment 111 of the lip 100. An opposite portion 110 of the tube 104 projects from the flange 106 in a substantially opposite direction from the first portion 108, and through the mid and outer layers 84, 90.

During assembly, the first portion 108 of the tube 104 is press fitted against the lip 100 and into the through-bore 102. The tube portion 108 carries a surface 112 that generally faces radially outward. The surface 112 may include or define at least one contour 114 (i.e., one illustrated). The contour 114 is generally located at the distal end segment 109 of the first portion 108 and may be configured to provide a seal between the distal end segment 109 of the tube 104 and the distal end segment 111 of the liner lip 100. Moreover, the contour 114 may provide a degree of friction that, at least in-part, prevents dislodgement of the tube 104 from the first vessel 22. A non-limiting example of a contour 114 may be a circumferentially continuous barb. The barb 114 may be further configured to assist in the insertion of the tube 104 into the lip 100 (i.e., via a ramp carried by the barb), while resisting withdrawal of the tube from the lip. Furthermore, and after final assembly, the dislodgement or withdrawal of the tube 104 from the liner 28 is further prohibited by the mid and outer layers 84, 90 place over the flange 106 and up to (i.e. tightly surrounding) the outer portion 110.

The supply nozzle assembly 94 may further include a resiliently compressible o-ring 115 that facilitates a seal between the tube 104 and the lip 100 of the liner 28 whether or not the chamber 40 is under a high pressure condition. In contrast, the barb 114 may provide a further seal between the tube 104 and the lip 100 during relatively high pressure conditions but not necessarily low or no pressure conditions depending, at least in-part, upon the flexibility of the lip 100. The o-ring 115 may be seated in a circumferentially continuous groove 117 having boundaries defined by the surface 112. The groove 117 may be in the distal end segment 109 of the tube portion 108, and may be defined in-part by the barb 114 (i.e., the barb is directly adjacent to the groove). When the pressure vessel assembly 20 is fully assembled, the o-ring 115 is resiliently compressed between the distal end segment 109 of the tube portion 108 and the distal end segment 111 of the lip 100.

The supply nozzle assembly 94 may be made of a metallic alloy that may be one unitary piece requiring no or minimal machining. The liner 28 may be made of a blow molded plastic that may be compliant with respect to the nozzle assembly. That is, the nozzle assembly 94 and the liner 28 may be made out of any variety of materials with the nozzle assembly 94 material being harder than the liner 28 material. This difference in hardness assists sealing engagement of the barbs 114 against the lip 100. Moreover, pressurized use of the pressure vessel assembly 20 produces a biasing force (see arrows 116) against the lip 100 and wall 98 thus pressing the lip and wall against the respective tube portion 108 and flange 106, further promoting the desired sealing relationship of the nozzle assembly 94 to the liner 28.

Figure 8:
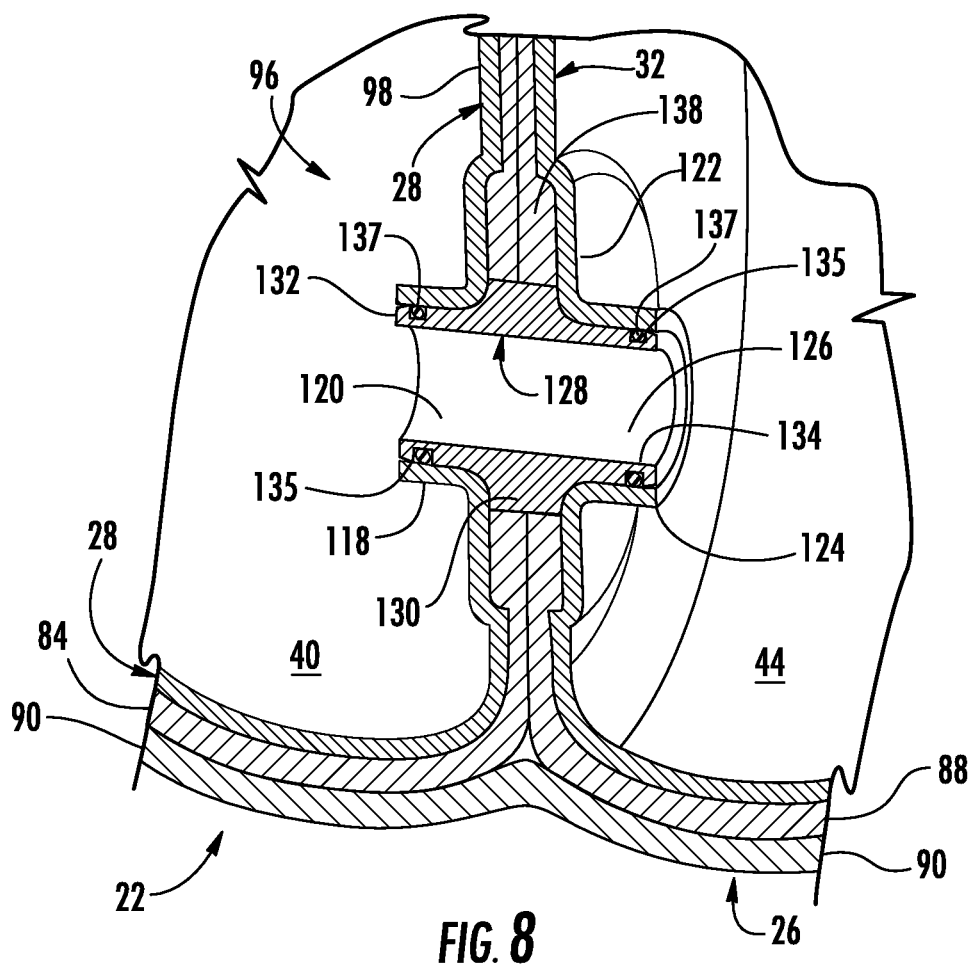
FIG. 8 is an enlarged cross section of a transfer nozzle assembly of the pressure vessel assembly.

Referring to FIGS. 6 and 8, the liner 28 of the first vessel 22 may include a second lip 118 that projects into the chamber 40 from the wall 98. The lip 118 may be circumferentially continuous and defines a through-bore 120 in fluid communication with the chamber 40. In the same proximity, the liner 32 of the vessel 26 may include a wall 122 that defines the chamber 44, and a third lip 124 that projects into the chamber 44 from the wall 122. The lip 124 may be circumferentially continuous and defines a through-bore 126 in fluid communication with the chamber 44.

The transfer nozzle assembly 96 may include a tube 128 and a flange 130 that projects radially outward from the tube 128 and may be circumferentially continuous (i.e. annular). The flange 130 is generally disposed and in contact between the liner walls 98, 122 of the respective liners 28, 32. The tube 128 may provide direct fluid communication between the chambers 40, 44. The tube 128 may include a first portion 132 that projects from the flange 130, through the through-bore 120 and generally into the chamber 40. An opposite portion 134 of the tube 128 projects from the flange 130 in a substantially opposite direction from the first portion 132, through the through-bore 126 and generally into the chamber 44.

During assembly, the first and second portions 132, 134 of the tube 128 are press fitted against the respective lips 118, 124 and into the respective through-bores 120, 126. Similar to the supply nozzle assembly 94, the tube portions 132, 134 may each carry an outer surface that defines a respective barb 135. The barbs 135 may be configured to assist in the insertion of the tube 128 into the lips 118, 124, while resisting withdrawal of the tube from the lips. Also similar to the supply nozzle assembly 94, the transfer nozzle assembly 96 may further include two o-rings 137 respectively compressed between first and second tube portions 132, 134 and respective lips 118, 124.

The transfer nozzle assembly 96 may be made of a metallic alloy that may be one unitary piece requiring no or minimal machining. The liners 28, 32 may be made of a blow molded plastic that may be compliant with respect to the nozzle assembly. That is, the nozzle assembly 96 and the liners 28, 32 may be made out of any variety of materials with the nozzle assembly 96 material being harder than the material of the liners 28, 32. This difference in hardness assists sealing engagement of the barbs (not shown) against the lips 118, 124. Moreover, pressurized use of the pressure vessel assembly 20 produces a biasing force against the lips 118, 124 and walls 98, 122 thus pressing the lips and walls against the respective tube portions 132, 134 and flange 130 further promoting the desired sealing relationship of the nozzle assembly 96 to the liners 28, 32.

The mid-layers 84, 88 may generally include adjacent boss segments 138 that generally surround the outer perimeter of the flange 130. The boss segments 138 may generally be an annular volume where both layers 84, 88 are increased in thickness to provide greater structural support at the vicinity of the transfer nozzle assembly 96. The walls 98, 122 of the respective liners 28, 32 may be recessed or contoured for providing the necessary space required by the boss segments 138.

The composite pressure vessel assembly 20 may provide a lightweight storage tank(s) with a high energy storage density. The approach enables the easy addition of reinforcing composite material where needed (e.g. junctions 92). The use of the hybrid continuous and short fiber may further minimize the vessel assembly weight. Because the vessel assembly 20 is in a non-cylindrical shape, the assembly will provide the highest conformability to a given space. Moreover, the composite construction will also provide corrosion resistance compared to metallic tanks.

The present disclosure also provides a cost effective solution in joining a nozzle assembly that may be metallic with a liner that may be a polymer. That is, the liners may be produced using an inexpensive flow molding process and machining costs of the metallic nozzle assembly is less expensive due to a simpler geometry when compared to traditional nozzle assemblies. Moreover, the static lip seal arrangement provides an elegant and simple solution, not only for a vessel port, but also for connecting multiple chambers internally and adaptable over a wide range of pressure.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:
1. A pressure vessel assembly comprising:
a vessel including a wall defining a chamber and a circumferentially continuous lip projecting into the chamber from the wall, the lip defining a through-bore in fluid communication with the chamber; and
a nozzle assembly including a tube projecting at least in-part into the through-bore, and an o-ring disposed between and in sealing contact with the tube and the lip, wherein the nozzle assembly includes a flange projecting radially outward from the tube and in contact with the wall, wherein the tube includes a first portion projecting axially inward from the flange and into the through-bore and an opposite second portion projecting axially outward from the flange, wherein the first portion includes an outer surface having a contour constructed and arranged to engage the lip, wherein the contour is circumferentially continuous, and wherein the vessel includes a layer enveloping the wall with the flange disposed between the wall and the layer and the first portion projects through the layer.

2. The pressure vessel assembly set forth in claim 1, wherein the contour is a barb constructed and arranged to produce a sealing friction between the lip and the outer surface when the pressure vessel assembly is under a positive pressure.

3. The pressure vessel assembly set forth in claim 2, wherein an internal pressure in the chamber biases the lip radially inward against the barb, and wherein the o-ring is resiliently compressed between the outer surface and the lip.

4. The pressure vessel assembly set forth in claim 1, wherein the o-ring and the contour are proximate to a distal end segment of the first portion.

5. The pressure vessel assembly set forth in claim 4, wherein the o-ring is located axially outward from the contour.

6. The pressure vessel assembly set forth in claim 1, wherein the tube is made of a material that is harder than a material of the lip.

7. The pressure vessel assembly set forth in claim 1, wherein the wall and the lip are part of a liner.

8. The pressure vessel assembly set forth in claim 1, wherein the wall and the lip are part of a liner, and the layer is made of a composite and the liner is blow molded plastic.

9. The pressure vessel assembly set forth in claim 8, wherein the composite is a resin impregnated fiber.

10. A pressure vessel assembly comprising:
a first vessel including a first wall defining a first chamber and a circumferentially continuous first lip projecting into the first chamber from the first wall, the first lip defining a first through-bore in fluid communication with the first chamber;
a second vessel including a second wall defining a second chamber and a circumferentially continuous second lip projecting into the second chamber from the second wall, the second lip defining a second through-bore in fluid communication with the second chamber; and
a nozzle assembly including a tube projecting at least in-part into the first and second through-bores, a first o-ring disposed between and in sealing contact with the tube and the first lip, and a second o-ring disposed between and in sealing contact with the tube and the second lip, wherein the nozzle assembly includes a flange projecting radially outward from the tube and disposed between the first and second walls, and wherein the first vessel includes a first layer enveloping the first wall, the second vessel includes a second layer enveloping the second wall and in-part in contact with the first layer, and wherein the tube projects through the first and second layers.

11. The pressure vessel assembly set forth in claim 10, wherein the nozzle assembly includes a first contour projecting radially outward from the tube and in contact with the first lip, and a second contour projecting radially outward from the tube and in contact with the second lip.

12. The pressure vessel assembly set forth in claim 11, wherein the first and second contours and the first and second o-rings are proximate to distal end segments of the respective first and second lips.

13. The pressure vessel assembly set forth in claim 11, wherein the first and second contours are circumferentially continuous barbs.

* * * * *